United States Patent [19]

Kuo

[11] Patent Number: 5,213,372
[45] Date of Patent: May 25, 1993

[54] INDICATOR SEAL FOR FILM CARTRIDGE

[76] Inventor: Mark S. Kuo, 30 S. Chapel Ave., #B, Alhambra, Calif. 91801

[21] Appl. No.: 985,877

[22] Filed: Dec. 4, 1992

[51] Int. Cl.⁵ .............................................. B42D 15/00
[52] U.S. Cl. .................................... 283/81; 206/459.5
[58] Field of Search ................... 283/81, 105; 206/232, 206/459.5

[56] References Cited

U.S. PATENT DOCUMENTS

| | | | |
|---|---|---|---|
| 3,482,681 | 12/1969 | Nerwin et al. | 206/459.5 |
| 4,964,512 | 10/1990 | Ingram et al. | 206/459.5 |
| 4,994,828 | 2/1991 | Smart | 354/21 |

*Primary Examiner*—Mark Rosenbaum
*Assistant Examiner*—Kenneth J. Hansen

[57] ABSTRACT

An apparatus is provided as an indicator seal for a film cartridge, the cartridge having a cylindrical well for accepting a rewinding shaft of a camera. The seal comprises a disk made of sheet material and having a pair of sides. The disk has an outside diameter for fitting on an end surface of the cartridge, and a circular partial perforation formed in the disk concentrically with the outer diameter. The partial perforation separates the disk into an outer annular part and an inner disk shaped part. The outer part has an adhesive layer on one of the sides of the disk such that the outer part may be adhered to the end surface of the film cartridge. A printed warning is included on the side without the adhesive such that the warning is normally in plain sight when the seal is attached to the cartridge. An additional indicia may be included on the side without the adhesive for indicating recommended action.

5 Claims, 1 Drawing Sheet

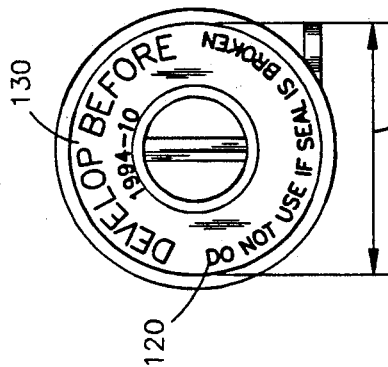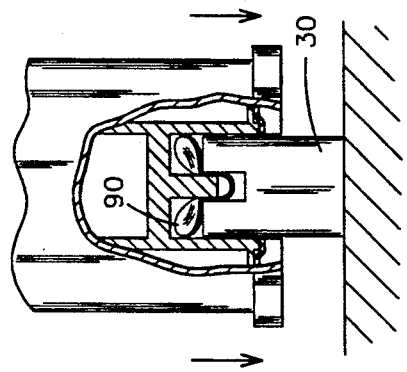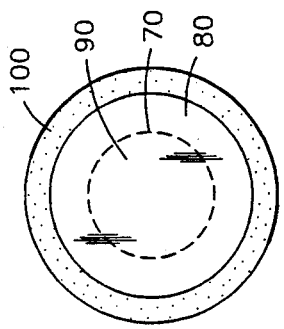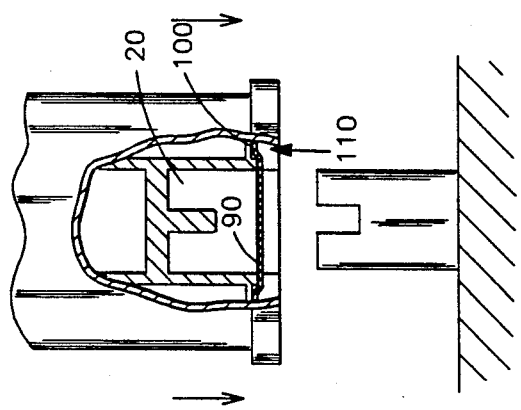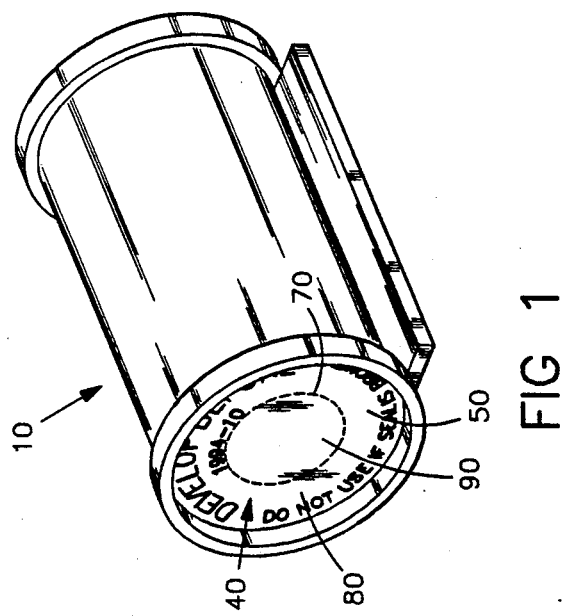

INDICATOR SEAL FOR FILM CARTRIDGE

FIELD OF THE INVENTION

This invention relates generally to indicator seals, and, more particularly, is directed towards an indicator seal for a film cartridge.

BACKGROUND OF THE INVENTION

When loading a film cartridge, such as 35 mm film cartridge, into a camera, one must first determine whether or not the cartridge has been previously loaded and exposed. Many cameras automatically rewind an exposed cartridge of film such that no film leader is left protruding from the cartridge. A film cartridge with no leader generally indicates that the film in the cartridge has been exposed. However, many cameras do not automatically or completely rewind the exposed film into the cartridge, leaving the possibility of some film leader protruding from the cartridge. As such, there is not way to tell whether or not such a roll of film has been exposed, since it closely resembles a new roll of film. Inadvertently loading such a previously used film cartridge results in multiply-exposed film. As a result, many pictures are lost due to inadvertent loading of previously used film cartridges.

Moreover, many pictures are lost due to exposed film not being developed in a timely manner. As conventional film cartridges have no means of easily indicating a manufacturing date, or a date by which it is best to develop the film, manufacturers have not been able to inexpensively add a date indication to their film products.

U.S. Pat. No. 4,994,828 to Smart on FIG. 19, 1992, teaches a camera apparatus for preventing the loading of exposed film. Such devices need to be built into the camera, and only work with a particular type of film cartridge. Such devices, therefore, are of no use to those whom already have cameras, or those whom wish to use conventional film cartridges. Moreover, such devices serve to mechanically prevent the loading of previously exposed film. Such mechanical devices are extremely expensive to develop and manufacture, and are prone to mechanical jamming and failure. Since competition in the camera market is strong, any additional devices included with a camera must provide considerable benefit versus cost. As such, prior art devices of this type have not been incorporated into many cameras.

Clearly, then, a device is needed for indicating both whether or not a film cartridge has been previously loaded into a camera, and when the film was manufactured or by when the film should be developed. Such a needed device would be extremely inexpensive and easy to manufacture and install on film cartridges. The present invention fulfills these needs and provides further related advantages.

SUMMARY OF THE INVENTION

The present invention is an indicator seal for a film cartridge, the cartridge having a cylindrical well for accepting a rewinding shaft of a camera. The seal comprises a disk made of sheet material and having a pair of opposing sides. The disk has an outside diameter for fitting on an end surface of the cartridge, and a circular partial perforation formed in the disk concentrically with the outer diameter. The partial perforation separates the disk into an outer annular part and an inner disk shaped part. The outer part has an adhesive layer on one of the sides of the disk such that the outer part may be adhered to the end surface of the film cartridge. A printed warning is included on the side without the adhesive such that the warning is normally in plain sight when the seal is attached to the cartridge. An additional indicia may be included on the side without the adhesive for indicating recommended action.

In use, the adhesive layer is exposed on the one side of the disk. The one side of the disk with the adhesive layer is placed against the end surface of the cartridge with the inner part positioned over the well. As such, when the cartridge is placed into a camera, the rewinding shaft is forced to sever the inner part from the outer annular part of the disk, thereby rendering the cartridge as identifiable as having been loaded into a camera.

The present invention indicates both whether or not a film cartridge has been previously loaded into a camera, and when the film was manufactured or by when the film should be developed. The present invention is extremely inexpensive and easy to manufacture and install on film cartridges. The present device may be made in a variety of colors, and ay include a variety of printed images. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective illustration of the invention, illustrating a disk adhered to an end surface of an unused film cartridge, the disk having an inner disk-shaped part attached at a perforation to an outer annular part;

FIG. 2 is a front elevational view of the invention, illustrating the disk of FIG. 1 without the inner disk-shaped part attached to the outer annular part, indicating a previously used film cartridge;

FIG. 3 is a rear elevational view of the invention, illustrating a side of the disk of FIG. 1 with an adhesive layer;

FIG. 4 is a partially cut away top plan view of the invention, illustrating an unused film cartridge with the disk of FIG. 1 approaching a rewinding shaft of a camera; and FIG. 5 is a partially cut away top plan view of the invention, illustrating the inner disk-shaped part of the disk of FIG. 4 broken away from the outer annular part of the disk by the rewinding shaft of FIG. 4.

DETAILED DESCRIPTION OF THE PREFERRED EMBODIMENT

FIGS. 1 and 2 show in indicator seal for a film cartridge 10 that has a cylindrical well 20 for accepting a rewinding shaft 30 of a camera. Such a cartridge 10 may be a cartridge of 35 mm film, 120 type film, 220 type film, or the like.

The seal comprises a disk 40 made of sheet material, such as paper, and having a pair of sides 50. The disk 40 has an outside diameter 60 for fitting on an end surface 110 of the cartridge 10, and a circular partial perforation 70 formed in the disk 40 concentrically with the outer diameter 60. The partial perforation 70 separates the disk into an outer annular part 80 and an inner disk shaped part 90. The outer part 80 has an adhesive layer 100 on one of the sides 50 of the disk 40 such that the outer part 80 may be adhered to the end surface 110 of the cartridge 10.

A printed warning 120 may be included on the side 50 without the adhesive 100 such that the warning 120 is normally in plain sight when the seal is attached to the cartridge 10. Such a warning 120 may be to prevent use of the cartridge 10 when the inner disk shaped part 90 is not attached to the outer annular part 80. An additional indicia 130 may be included on the side 50 without the adhesive 100 for indicating recommended action.

In use, the adhesive layer 100 is exposed on the one side 50 of the disk 40. The one side 50 of the disk with the adhesive layer 100 is placed against the end surface 110 of the cartridge with the inner part 90 positioned over the well 20. As such, when the cartridge 10 is placed into a camera, the rewinding shaft 30 is forced to sever the inner part 90 form the outer annular part 80 of the disk 40, thereby rendering the cartridge 10 as identifiable as having been loaded into a camera.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An indicator seal for use with a film cartridge having a circular end surface of predetermined diameter with the end surface having a cylindrical rewinding shaft well concentrically emplaced therein, the seal comprising:

a disk of sheet material having opposing sides and an outside diameter less than said predetermined diameter such that said seal may be emplaced upon the end surface of the film cartridge, said disk of sheet material further having a circular partial perforation concentrically formed therein with the partial perforation separating said disk into an outer annular part and an inner disk-shaped part, said outer part having an adhesive layer on one of said opposing sides such that the outer part may be adhered to the end surface of the cartridge while the inner part is positioned over the rewinding shaft well such that when the cartridge is loaded into a camera, the camera rewinding shaft will be force to sever the inner disk shaped part form the outer annular part so that the cartridge is thereafter identifiable as having been loaded into a camera.

2. The seal of claim 1 wherein said sheet material is paper.

3. The seal of claim 1 further including indicia comprising a printed warning on one of said sides such that said warning is normally visible when the seal is attached to the cartridge.

4. The seal of claim 3 wherein the content of said indicia comprises a warning to prohibit use of the cartridge when said inner disk-shaped part is not attached to the annular part.

5. The seal of claim 1 further including indicia recommending a desired developing date.

* * * * *